US010008025B2

(12) United States Patent
Borodavka et al.

(10) Patent No.: US 10,008,025 B2
(45) Date of Patent: Jun. 26, 2018

(54) RENDERING SYSTEM AND RENDERING METHOD THEREOF

(71) Applicant: SAMSUNG ELECTRONICS CO., LTD., Suwon-si (KR)

(72) Inventors: Ievgenii Borodavka, Kyiv (UA); Oleksandr Lisovyi, Kyiv (UA); Dmytro Deineka, Varva (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 14/755,813

(22) Filed: Jun. 30, 2015

(65) Prior Publication Data

US 2016/0005210 A1 Jan. 7, 2016

(30) Foreign Application Priority Data

Jul. 7, 2014 (KR) .................. 10-2014-0084467

(51) Int. Cl.
*G06T 15/00* (2011.01)
*G06T 15/06* (2011.01)

(52) U.S. Cl.
CPC .................... *G06T 15/06* (2013.01)

(58) Field of Classification Search
USPC ............................... 345/419, 426
See application file for complete search history.

(56) References Cited

U.S. PATENT DOCUMENTS

| 6,556,200 B1* | 4/2003 | Pfister .............. G06T 15/55 345/426 |
| 6,597,359 B1 | 7/2003 | Lathrop |
| 7,495,664 B2 | 2/2009 | Keller et al. |
| 7,773,087 B2* | 8/2010 | Fowler .............. G06T 15/06 345/419 |
| 7,936,944 B2* | 5/2011 | Sato .............. G01B 11/002 345/426 |
| 8,018,453 B2* | 9/2011 | Fowler .............. G06T 13/20 345/419 |
| 8,102,389 B2* | 1/2012 | Fowler .............. G06T 17/005 345/419 |
| 8,188,997 B2 | 5/2012 | Dammertz et al. |

(Continued)

FOREIGN PATENT DOCUMENTS

| KR | 10-0372901 B1 | 2/2003 |
| WO | 2010/137821 A2 | 12/2010 |
| WO | 2012/111864 A1 | 8/2012 |

OTHER PUBLICATIONS

Search Report dated May 15, 2015 issued in International Application No. PCT/KR2015/001459 (PCT/ISA/210).

(Continued)

*Primary Examiner* — Kimbinh T Nguyen
(74) *Attorney, Agent, or Firm* — Sughrue Mion, PLLC

(57) ABSTRACT

A rendering system and a rendering method are provided. The rendering method of the rendering system includes: preparing, using an acceleration data structure, data, with respect to at least one object, for performing rendering; dividing, using projection onto a screen, an area into a background area and an object area in order to extract the at least one object; and performing ray-tracing with respect to the object area in order to render the at least one object.

8 Claims, 11 Drawing Sheets

(56) References Cited

U.S. PATENT DOCUMENTS

| | | | |
|---|---|---|---|
| 8,243,073 B2* | 8/2012 | Mejdrich | G06T 15/06 345/419 |
| 8,253,730 B1 | 8/2012 | Carr | |
| 8,259,105 B2 | 9/2012 | Wald et al. | |
| 8,284,188 B1 | 10/2012 | Lauterbach et al. | |
| 8,284,195 B2* | 10/2012 | Brown | G06T 15/06 345/419 |
| 8,339,398 B2* | 12/2012 | Shearer | G06T 15/005 345/419 |
| 8,350,846 B2* | 1/2013 | Mejdrich | G06T 17/005 345/418 |
| 8,411,088 B2 | 4/2013 | Sevastianov et al. | |
| 8,654,219 B2* | 2/2014 | Im | G06F 3/017 348/222.1 |
| 8,736,610 B2* | 5/2014 | McCombe | G06T 15/06 345/418 |
| 8,836,702 B2 | 9/2014 | Yoon et al. | |
| 8,882,593 B2* | 11/2014 | Yamashita | A63F 13/10 463/30 |
| 9,013,484 B1* | 4/2015 | Jakob | G06T 15/506 345/419 |
| 2006/0056726 A1* | 3/2006 | Fujiwara | G06T 15/08 382/276 |
| 2009/0102844 A1* | 4/2009 | Deparis | G06T 15/50 345/426 |
| 2009/0153556 A1 | 6/2009 | Nam et al. | |
| 2009/0167759 A1* | 7/2009 | Ushida | G06T 15/40 345/420 |
| 2009/0289939 A1* | 11/2009 | Peterson | G06T 15/06 345/421 |
| 2011/0246141 A1 | 10/2011 | Li | |
| 2012/0069023 A1 | 3/2012 | Hur et al. | |
| 2012/0075300 A1 | 3/2012 | Hur et al. | |
| 2013/0207967 A1 | 8/2013 | Park et al. | |
| 2013/0314420 A1 | 11/2013 | Yoon et al. | |
| 2014/0285776 A1* | 9/2014 | Inoue | H04N 9/3185 353/69 |

OTHER PUBLICATIONS

Written Opinion dated May 15, 2015 issued in International Application No. PCT/KR2015/001459 (PCT/ISA/237).

Glassner, A.S. "An Introduction to Ray Tracing"; Academic Press Limited; 1989; 351 pgs.

Christian Lauterbach, et al; "RT-Deform: Interactive Ray Tracing of Dynamic Scenes using BVHs"; 2006; Proceedings of the 2006 IEEE Symposium on Interactive Ray Tracing; 8 pgs.

Cartsen Wachter; "Instant Ray Tracing: The Bounding Interval Hierarchy"; 2006; Eurographics Symposium on Rendering; 11 pgs.

Jorg Schmittler et al; "Realtime Tracing of Dynamic Scenes on an FPGA Chip"; 2004; Graphics Hardware; 12 pgs.

* cited by examiner

RENDERING SYSTEM AND RENDERING METHOD THEREOF

CROSS-REFERENCE TO RELATED APPLICATION(S)

This application claims priority from Korean Patent Application No. 10-2014-0084467, filed on Jul. 7, 2014 in the Korean Intellectual Property Office, the disclosure of which is incorporated herein by reference in its entirety.

BACKGROUND

1. Field

Apparatuses and methods consistent with exemplary embodiments relate to a rendering system and a rendering method thereof, and more particularly, to a rendering system which implements hardware of a rendering system on a single chip thereby quickly and precisely performing rendering and a rendering method thereof.

2. Description of Related Art

Ray-tracing is a method of generating an image by reversely tracing a route of light along a ray towards each pixel of a virtual screen from a viewpoint of an observer (e.g., a camera). For example, ray-tracing may be used as an algorithm to render a three-dimensional (3D) screen.

Ray-tracing algorithms of the related art require a large amount of calculation. In particular, in ray-tracing algorithms of the related art, there is a linear dependence between the amount of time to render a screen and the amount and resolution of objects to be rendered. Accordingly, when a large number of high-resolution objects exist on a screen, rendering a screen takes a large amount of time.

Accordingly, there is a need for a technique that is capable of reducing the amount of calculation required for a ray-tracing algorithm such that rendering may be efficiently performed on a single chip of hardware.

SUMMARY

Exemplary embodiments address at least the aforementioned disadvantages and/or other problems and disadvantages not described above. Also, an exemplary embodiment is not required to overcome the aforementioned disadvantages, and an exemplary embodiment may not overcome any of the problems described above.

One or more exemplary embodiments provide a rendering system which enables rendering of a 3D screen to be executed quickly and precisely on a single chip of hardware and a rendering method thereof.

According to an aspect of an exemplary embodiment, there is provided a rendering method of a rendering system, the method including: preparing, using an acceleration data structure, data, with respect to at least one object, for performing rendering; dividing, using projection onto a screen, an area into a background area and an object area in order to extract the at least one object; and performing ray-tracing with respect to the object area in order to render the at least one object.

The preparing may include: classifying the at least one object based on a distance of the at least one object to the screen; and generating the acceleration data structure with respect to the classified at least one object.

The acceleration data structure may be a Bounding Volume Hierarchy (BVH) tree structure.

The dividing may include: calculating a basis point of at least one root node of the acceleration data structure; performing, using a projection matrix, the projection onto the screen; and marking and classifying a background pixel as the background area based on a result of the projection.

The object area may be an area to which a new object, calculated so as to include a predetermined number of objects from among the at least one object, is projected.

The performing may include: performing a first operation that generates an initial ray, detects a point where the initial ray intersects with a sphere or a plane, and performs a first rendering; and performing a second operation that generates at least one reference ray from the initial ray, detects a point where the at least one reference ray intersects with at least one of a sphere and a plane, and performs a second rendering.

The first operation and the second operation may be performed in parallel with each other.

The performing may include performing the ray-tracing with respect to only the object area.

According to an aspect of another exemplary embodiment, there is provided a rendering system including: a controller configured to prepare, using an acceleration data structure, data, with respect to at least one object, for performing rendering, and divide, using projection onto a screen, an area into a background area and an object area in order to extract the at least one object; and a ray tracer configured to perform ray-tracing with respect to the object area in order to render the at least one object.

The controller may be further configured to classify the at least one object based on a distance to the screen and generate the acceleration data structure with respect to the classified at least one object.

The acceleration data structure may be a Bounding Volume Hierarchy (BVH) tree structure.

The controller may be further configured to calculate a basis point of at least one root node of the acceleration data structure, perform, using a projection matrix, the projection onto the screen, and mark and classify a background pixel as the background area based on a result of the projection.

The object area may be an area to which a new object, calculated so as to include a predetermined number of objects from among the at least one object, is projected.

The ray tracer may be further configured to perform a first rendering operation by generating an initial ray and detecting a point where the initial ray intersects with at least one of a sphere and a plane, and perform a second rendering operation by generating at least one reference ray from the initial ray and detecting a point where the at least one reference ray intersects with at least one of a sphere and a plane.

The first rendering operation and the second rendering operation may be performed in parallel with each other.

The ray tracer may be further configured to perform the ray-tracing with respect to only the object area.

According to an aspect of another exemplary embodiment, there is provided a method of rendering, using at least one processor, a three-dimensional (3D) image corresponding to data representing at least one object in a 3D space, the method including: classifying the at least one object based on a distance of the at least one object from a virtual projection screen; generating an acceleration data structure based on the classified at least one object; dividing the virtual projection screen into an object area and a background area based on a projection, corresponding to the generated acceleration data structure, onto the virtual projection screen; and performing ray-tracing only with respect to the object area in order to render the 3D image.

The acceleration data structure may be a Bounding Volume Hierarchy (BVH) tree structure, the dividing may include calculating at least one basis point of at least one root node of the BVH tree structure, and the projection may be based on the at least one basis point.

The projection may include a predetermined number of objects from among the at least one object.

The projection may be a quadrangle.

According to various exemplary embodiments, a rendering system and a rendering method thereof enable rendering of a 3D screen to be executed quickly and precisely on a single chip of hardware.

BRIEF DESCRIPTION OF THE DRAWINGS

The above and/or other aspects of the will be more apparent by describing certain exemplary embodiments with reference to the accompanying drawings, in which.

DETAILED DESCRIPTION

Figure 1:
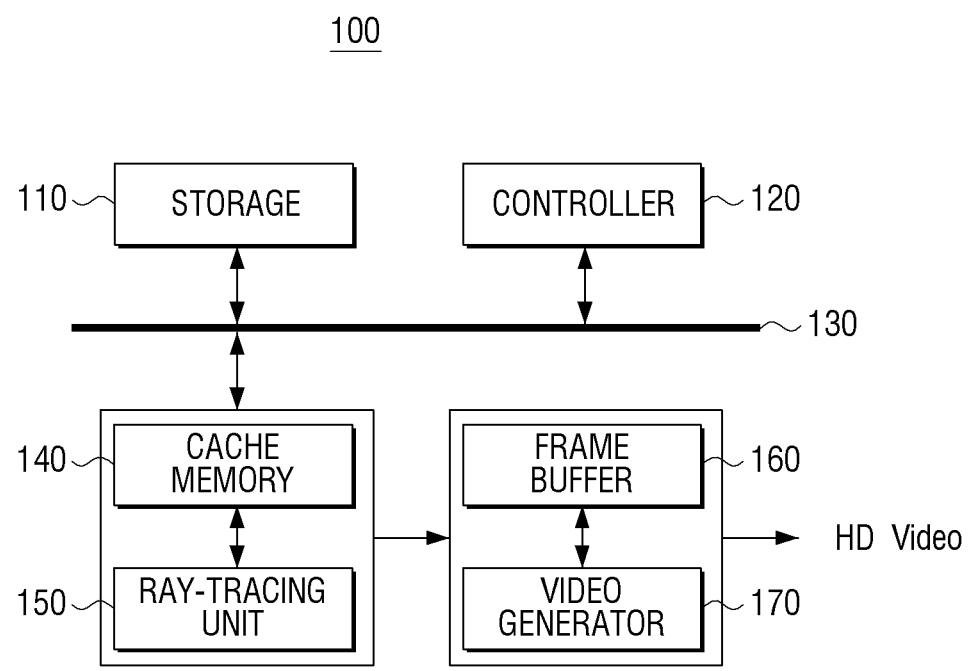
FIG. 1 is a block diagram illustrating a structure of a rendering system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a structure of a rendering system 100 according to an exemplary embodiment. As shown in FIG. 1, the rendering system 100 includes a storage 110, a controller 120, a bus 130, a cache memory 140, a ray-tracing unit 150 (i.e., a ray-tracer), a frame buffer 160, and a video generator 170.

The storage 110 is used for storing an acceleration data structure and various parameters. For example, the storage 110 may store scene parameters and primitive parameters.

The controller 120 controls overall operations of the rendering system 100. For example, the controller 120 may prepare data, with respect to at least one object, for performing rendering by using an acceleration data structure and dividing an area into a background area and an object area by using projection onto a screen (e.g., a virtual projection screen) in order to extract the at least one object.

For example, the controller 120 may classify at least one object based on a distance to a screen and generate an acceleration data structure with respect to the classified at least one object.

For example, the controller 120 may use a Bounding Volume Hierarchy (BVH) tree structure as the acceleration data structure. However, this is merely an example, and the controller 120 may also use a tree structure, such as k-dimensional trees (KD-trees), binary space partitioning trees (BSP-trees), Bounding Interval Hierarchy (BIH), and the like, as the acceleration data structure.

The controller 120 may calculate a basis point of at least one root node of an acceleration data structure and control to perform projection onto a screen with respect to the root node by using a projection matrix. In addition, the controller 120 may control to mark and classify background pixels as a background area based on a result of the projection.

An object area refers to an area to which a new object, calculated so as to include a predetermined number of objects from among the at least one object, is projected. For example, in response to the predetermined number being 4, the controller 120 may calculate a central point and radius of the new object so that four objects which are adjacent to each other are included in the new object. In addition, the controller 120 may control to project a newly formed object to a screen. Accordingly, the object area refers to an area to which the newly formed object is projected.

In addition, in response to a tree structure (e.g., as discussed above) being used as an acceleration data structure, the object area may be a quadrangle.

The bus 130 is used for connecting each component of the rendering system 100. That is, the storage 110, the controller 120, and various components for performing ray-tracing may be connected through the bus 130.

The cache memory 140 and the ray-tracing unit 150 are used for performing ray-tracing.

Accordingly, by control of the controller 120, the ray-tracing unit 150 may perform ray-tracing with respect to at least one object. That is, the ray-tracing unit 150 may perform ray-tracing of an area which excludes the pixels that are marked by the controller 120 as background pixels.

Meanwhile, the cache memory 140 is used for holding a primitive parameter which has been accessed most recently.

The ray-tracing unit 150 may generate an initial ray, detect a point where the initial ray intersects with a sphere or a plane, and detect a shadow area. In addition, in parallel with this operation, the ray-tracing unit 150 may generate at least one reference ray, detect a point where the at least one reference ray intersects with a sphere or a plane, and detect a shadow area by the reference ray.

In order to perform the ray-tracing, the ray-tracing unit 150 may include a plurality of sub-components. However, for convenience of description, a detailed description for these sub-components is omitted herein.

The frame buffer 160 may be a First in-First out (FIFO) memory for storing a predetermined number of frames. For example, the frame buffer 160 may store last three frames, but this is merely an example. The frame buffer 160 may also be a Last-in, First-out (LIFO) memory, but is not limited thereto. The frame buffer 160 may be used for synchronizing the ray-tracing unit 150 and the video generator 170 and outputting a video stream.

The video generator 170 is used for generating a video signal. For example, the video generator 170 may be initialized by control of the controller 120 and may generate a video signal according to a High Definition Multimedia Interface (HDMI) protocol. However, this protocol is merely exemplary and is not limited thereto.

The aforementioned rendering system 100 is able to perform realistic rendering of a 3D model by using a single chip such as Field-Programmable Gate Array (FPGA), Application-Specific Integrated Circuit (ASIC), and the like.

Figure 2:
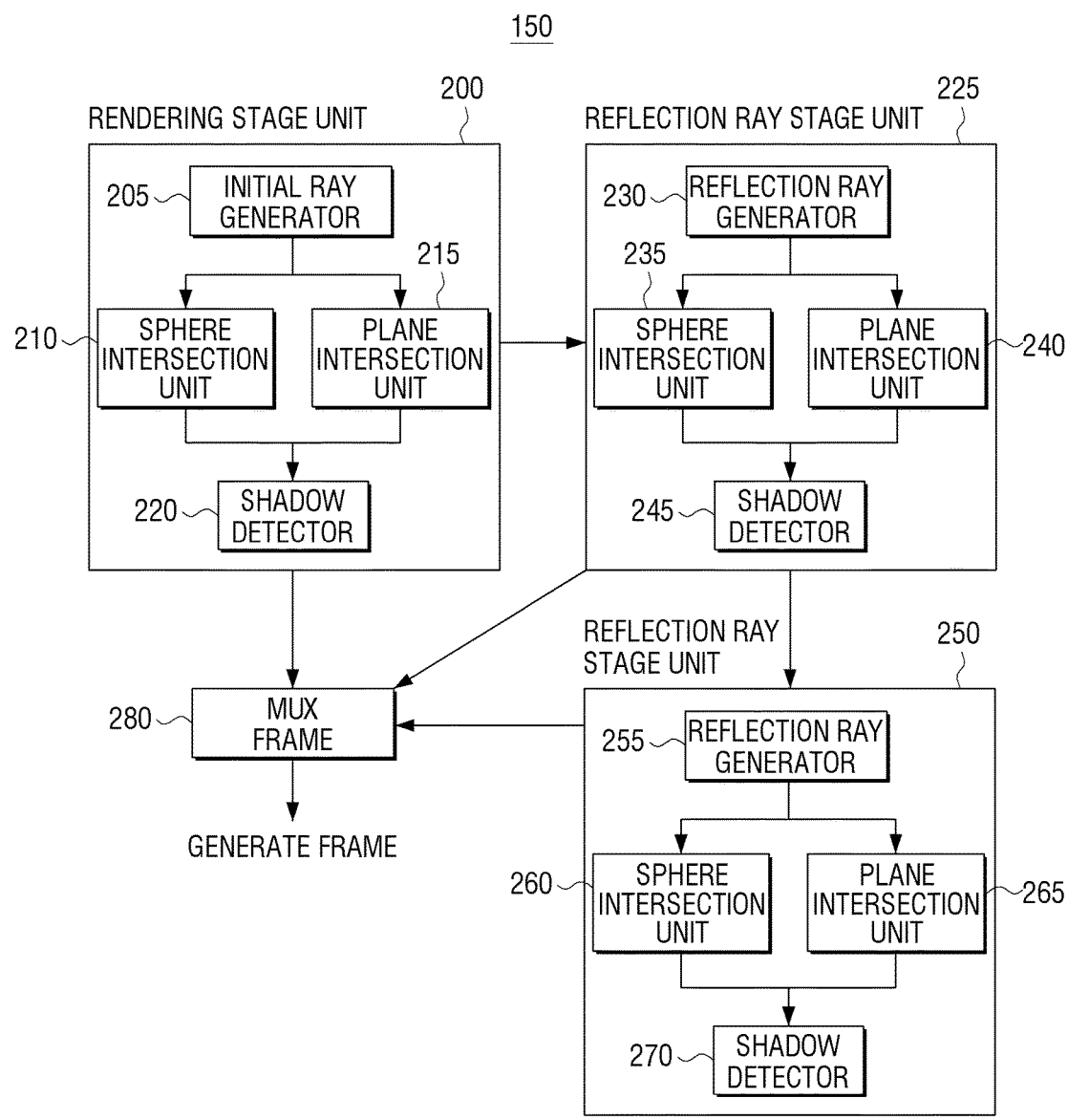
FIG. 2 is a block diagram illustrating a structure of a ray-tracing unit according to an exemplary embodiment.

FIG. 2 is a block diagram illustrating a structure of the ray-tracing unit 150 according to an exemplary embodiment.

The ray-tracing unit 150 may include a rendering stage unit 200 having an initial ray generator 205, and a reflection ray stage unit 225, 250, but is not limited thereto. The ray-tracing unit 150 may further include a refraction ray stage unit for generating a refraction ray, as well as a reflection ray, and detecting an intersection between the refraction ray and a sphere or a plane. In FIG. 2, two reflection ray stage units 225, 250 are illustrated, but it is merely an example and the ray-tracing unit 150 may be implemented variously. For example, the ray-tracing unit 150 may be implemented to include one reflection ray stage unit and one refraction ray stage unit.

The rendering stage unit 200 may include the initial ray generator 205, a sphere intersection unit 210, a plane intersecting unit 215, and a shadow detector 220.

For example, the initial ray generator 205 is used for generating an initial ray. The initial ray generator 205 may generate an initial ray which is defined as a coordinate vector in two formats. One format is a vector which is not a normalized vector in an integer format. The other format is a normalized vector in a floating point format.

The sphere intersection unit 210 is used for finding an intersection point between the initial ray generated by the initial ray generator 205 and a sphere. For example, the sphere intersection unit 210 may define a coordinate of an intersection point and an identifier of a sphere.

The sphere intersection unit 210 may detect only an intersection point between a sphere and a ray which crosses a pixel included in an object area. For example, the sphere intersection unit 210 may only detect an intersection point with respect to an area which is not classified as a background pixel by the control of the controller 120.

The sphere intersection unit 210 may use a vector which is not a normalized vector in the integer format in order to determine intersection of a ray. In addition, the sphere intersection unit 210 may use a normalized vector in the floating point format in order to detect a coordinate of an intersection point.

The plane intersection unit 215 is used for finding an intersection point between the initial ray generated by the initial ray generator 205 and a plane. For example, the plane intersection unit 215 may define a coordinate of an intersection point and an identifier of a plane. The plane intersection unit 215 may use a ray in the floating point format and perform floating point calculation.

In response to the initial ray generated by the initial ray generator 205 generating a shadow, the shadow detector 220 detects the shadow. For example, the shadow detector 220 may calculate a contribution coefficient of a light source with respect to a color of an intersection point. The contribution coefficient of the light source may be calculated so as to have a value from 0 where an effect of a light exists to a maximum degree to 1 where the effect of the light does not exist. The contribution coefficient of the light source has a linear dependence on an angle between a vector from an intersection point and a light source and a normal vector on the intersection point (0 degree to 90 degrees). In response to the angle between the vector from the intersection point and the light source and the normal vector on the intersection point being greater than 90 degrees, a shadow effect may occur. Alternatively, in response to the vector from the intersection point to the light source intersecting with other primitives, the shadow effect may occur.

Meanwhile, a first reflection ray stage unit 225 may perform an operation in parallel with an operation performed by the rendering stage unit 200. In addition, a second reflection ray stage unit 250 may perform an operation in parallel with an operation performed by the first reflection ray stage unit 225.

For example, in response to the rendering stage unit 200 performing each operation with respect to a group of $i_{th}$ pixels, the first reflection ray stage unit 225 may perform each operation with respect to a group of $(i-1)_{th}$ pixels, and the second reflection ray stage unit 250 may perform each operation with respect to $(i-2)_{th}$ pixels.

In addition, a frame where a depth of a 3D effect is defined may be generated by the rendering stage unit 200, the first reflection ray stage unit 225, and the second reflection ray stage unit 250. A frame generated by each stage unit may be stored in the storage 110.

A reflection ray generator 230 of the first reflection ray stage unit 225 is used for generating a reflection ray as a reference ray. A sphere intersection unit 235 is used for finding an intersection point between a reflection ray generated by the reflection ray generator 230 and a sphere. In addition, a plane intersection unit 215 is used for finding an intersection point between a reflection ray generated by the reflection ray generator 230 and a plane. In response to the reflection ray generated by the reflection ray generator 230 generating a shadow, a shadow detector 220 detects the shadow.

A reflection ray generator 255 of the second reflection ray stage unit 250 is used for generating a reflection ray as a reference ray. A sphere intersection unit 260 is used for finding an intersection point between a reflection ray generated by the reflection ray generator 255 and a sphere. In addition, a plane intersection unit 265 is used for finding an intersection point between a reflection ray generated by the reflection ray generator 255 and a plane. In response to the reflection ray generated by the reflection ray generator 255 generating a shadow, a shadow detector 270 detects the shadow.

A mux frame 280 is used for selecting a frame based on a depth of a necessary 3D effect from among a result of operations performed by each stage unit 200, 225, 250, in order to generate a frame.

Figure 3:
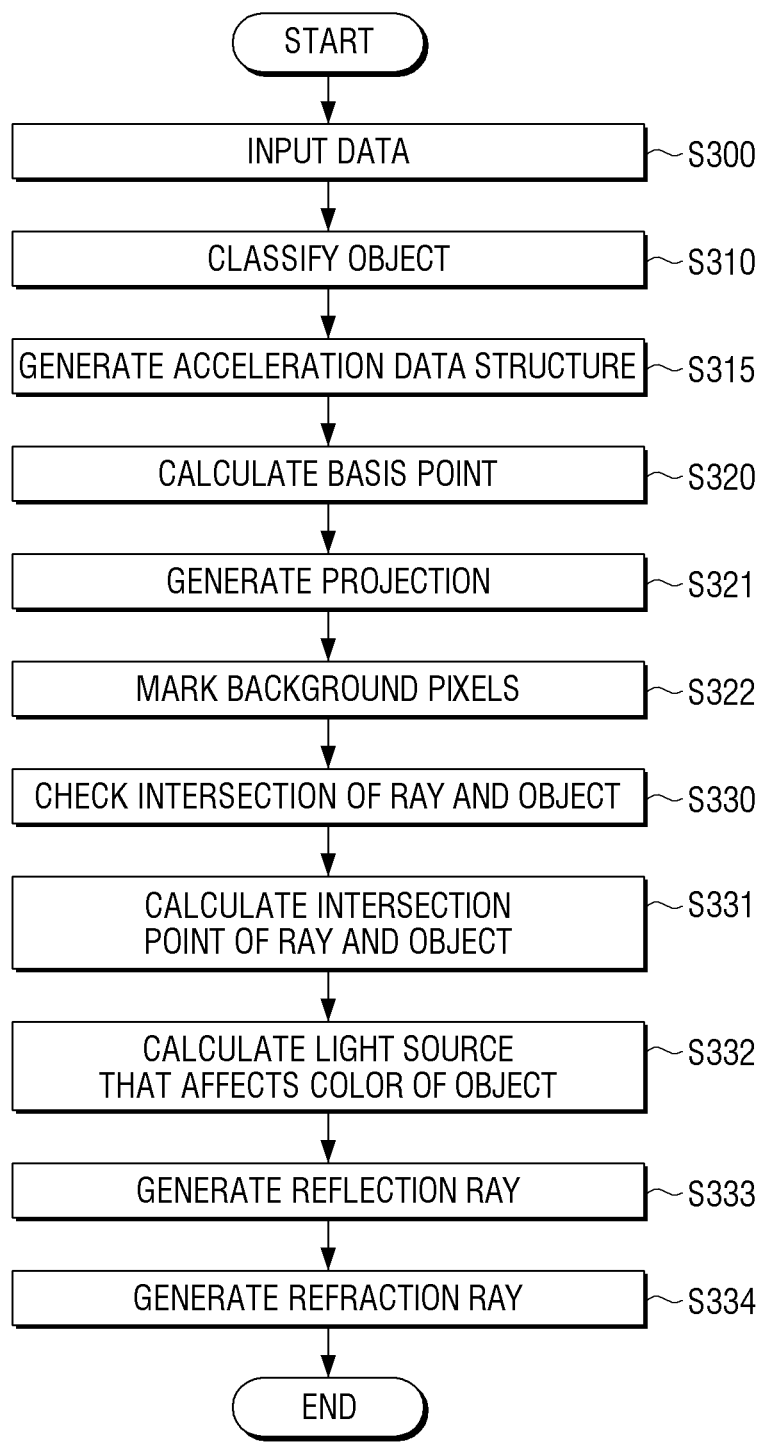
FIG. 3 is a flowchart illustrating a rendering method according to an exemplary embodiment.

FIG. 3 is a flowchart illustrating a rendering method of a rendering system according to an exemplary embodiment. In response to data being input (S300), the rendering system classifies objects (S310).

Figure 4:
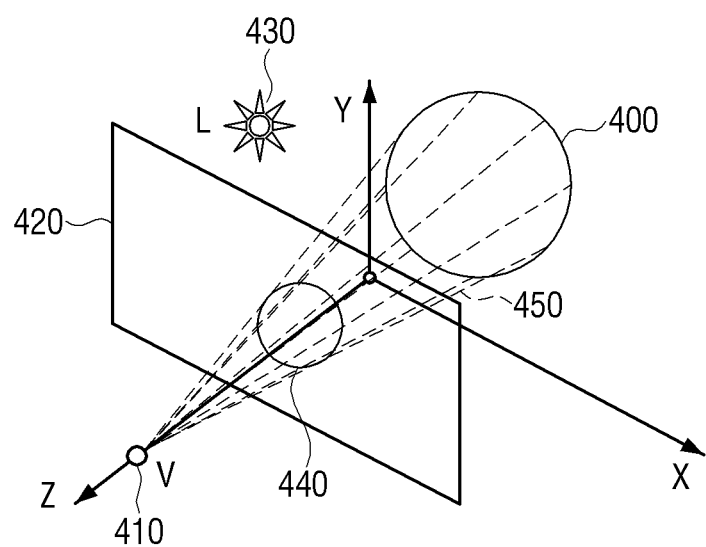
FIGS. 4 and 5 are diagrams illustrating an object, a light source, and a viewpoint of an observer.

For example, as shown in FIG. 4, it is assumed that an object 400 has a shape of sphere, a screen 420 is located in parallel with a X-Y plane at a position 'D' apart from the X-Y plane, a viewpoint of an observer (V) 410 is located on a Z-axis, and a light source (L) 430 exists.

In FIG. 4, only the single object 400 is illustrated. However, this is merely exemplary and more than one object 400 may exist. Accordingly, in response to there being a plurality of objects, the rendering system 100 may classify all of the existing objects based on the coordinate of the central point of each object on the Z-axis.

The rendering system 100 generates an acceleration data structure (S315). For example, after classifying all of the existing objects, the rendering system 100 may form an acceleration data structure. A tree structure may be used as the acceleration data structure. For example, as set forth above, KD-trees, BSP-trees, BVH, BIH, and the like may be used.

In order to separate out a background area, the rendering system 100 calculates a basis point (S320). Subsequently, the rendering system 100 generates a projection by using a projection matrix (S321). For example, in order to reduce an amount of calculation, the rendering system 100 may use only a predetermined number of basis coordinates of a root node. Based on a result of the projection, the rendering system 100 marks certain pixels as background pixels (S322). For pixels that are marked as background pixels, the rendering system 100 may not perform an further ray-tracing. In response to the acceleration data structure being a tree structure, the rendering system 100 may mark a background area in a form of a quadrangle.

After separating and marking the background pixels, the rendering system 100 performs the ray-tracing with respect to pixels other than the background pixels. Firstly, the rendering system 100 checks whether a ray intersects with an object (S330). If it is determined that the ray intersects with the object, the rendering system 100 calculates an intersection point between the ray and the object (S331). That is, in response to the intersected object being a leaf node of a tree, an intersection point is calculated. Accordingly, the rendering system 100 tests whether a ray which crosses the tree intersects with each node. In response to all of the intersected objects being found, the rendering system 100 may select the object which is closest to the screen 420 for rendering.

Subsequently, the rendering system 100 calculates a light source which affects a color of the object (S332). For example, the light source (L) 430 makes the greatest contribution to object color information. In response to the light source 430 being blocked by an object, a shadow effect occurs. Accordingly, in case the shadow effect does not occur, the rendering system 100 may calculate a contribution coefficient of a light source in order to obtain the object color information. For example, the rendering system 100 may calculate a contribution coefficient by using a normal unit vector of the object and a unit vector which represents a location of the light source 430.

Subsequently, the rendering system 100 generates a reflection ray as a reference ray (S333) and finds an object which intersects with the generated reflection ray. In addition, the rendering system 100 generates a refraction ray sequentially or simultaneously (S334). Subsequently, the rendering system 100 finds an object which intersects with the generated refraction ray.

In response to the reflection ray or the refraction ray intersecting with an arbitrary object, the color of the intersected object is mixed with the color of the object which is currently rendered, based on a coefficient of each object.

By the aforementioned rendering method, the rendering system 100 may be implemented on hardware on a single chip.

Hereinafter, an exemplary embodiment will be described in detail with reference to FIGS. 5 to 10.

Figure 5:
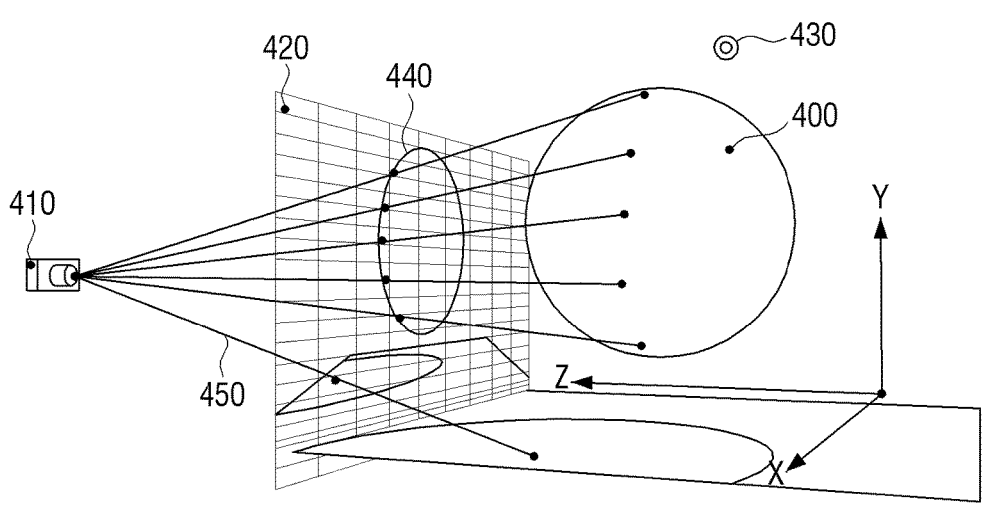

FIG. 5 is a view illustrating an exemplary embodiment where the object 400 having a sphere shape is located in a 3D space. The object 400 has a color, a radius (R), a central point coordinate (C), a reflection coefficient (A), and an identifier (ID).

The screen to which the object 400 is projected may have High Definition (HD) resolution (e.g., 1280×720 pixels). As illustrated in FIG. 5, the screen 420 is parallel with the X-Y plane and is a distance 'D' from the X-Y plane. That is, the normal unit vector of the screen is (0,0,1). Although the screen 420 is illustrated in parallel with the X-Y plane and is the distance 'D' apart from the X-Y plane, this is merely an example. For example, the screen 420 may be located so as to be parallel with other planes including the X-Y plane. The viewpoint (V) of the observer 410 is located on the Z-axis. The light source 430 is also included in the 3D space.

In order to generate a realistic image of each object on the screen 420 using a ray-tracing algorithm, the observer 410 may cast a ray 450 through each pixel of the screen 420 and detect the intersection of the ray 450 with the object 400.

In order to reduce the number of traced pixels, the acceleration data structure may be used. For example, a tree structure, such as KD-trees, BSP-trees, BVH, BIH, and the like, may be used as the acceleration data structure.

In order to further reduce the number of the traced pixels, the rendering system 100 may divide an area into a background area and an object area by using projection onto the screen 420. For example, the rendering system 100 may separate and mark pixels included in a background area including background pixels.

Figure 6:
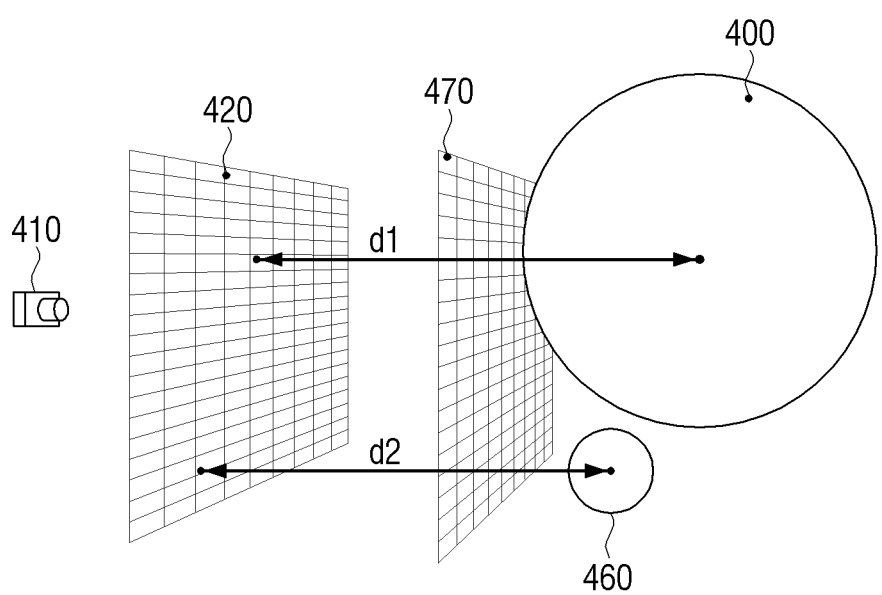
FIG. 6 is a diagram illustrating a method of classifying a plurality of objects of a rendering system according to an exemplary embodiment.
Figure 7:
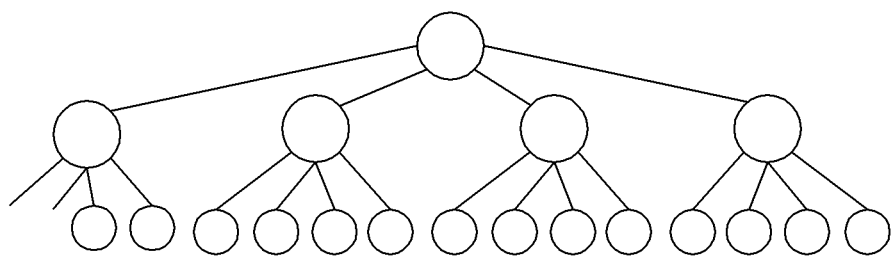
FIG. 7 is a diagram illustrating a structure of a BVH tree.

FIGS. 6 and 7 are views illustrating a case in which the acceleration data structure is a BVH tree structure.

In FIG. 5, the observer 410 is located on a positive direction of the Z-axis. In this case, an object may be located on a negative direction of the Z-axis. The rendering system 100 may classify at least one object having a sphere shape in an ascending order of distance.

For example, in response to at least one object being classified, the rendering system 100 may use only the Z-axis coordinate value of the central point of each object and may not consider the radius of each object.

For example, in FIG. 6, a front side 470 of the object 400 having a wide radius is closer to the screen 420 than a front side of the object 460. However, the distance (d1) from a central point of the object 400 having a wide radius to the screen 420 is larger than the distance (d2) from a central point of an object 460 having a narrow radius to the screen 420.

Accordingly, even though the front side 470 of the object having a wide radius is closer to the screen 420 than the front side of the object 460, the rendering system 100 may classify the objects in an ascending order of a distance based only on the distance of the Z-axis coordinate s of the central point of each object to the screen 420.

By classifying the objects according to the aforementioned method, the rendering system 100 may generate a BVH tree quickly. For example, as shown in FIG. 7, the rendering system 100 may generate a BVH tree having four children at each level. For convenience of description, the specific methods for generating a BVH tree, which are known by those skilled in the art, are omitted.

Because 3D object rarely fill an entire screen, upon completion of the BVH tree, the rendering system 100 may divide the screen into the background area and the object area. Accordingly, the rendering system 100 may not trace pixels that are included in the background area of a simple screen where any object does not exist (i.e., background pixels). The rendering system 100 may divide the screen into the background area and the object area by detecting background pixels using a projection matrix.

Figure 8:
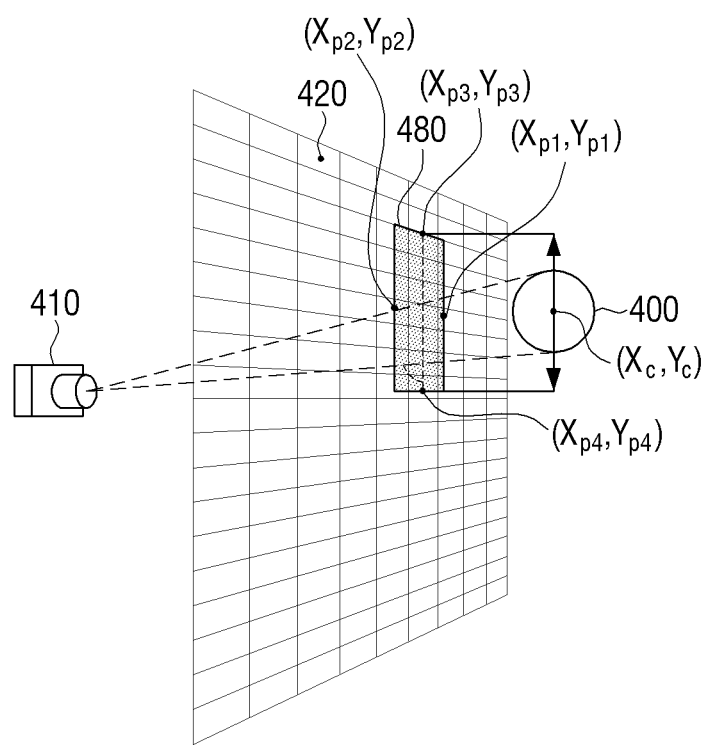
FIG. 8 is a diagram illustrating acquiring an object area according to an exemplary embodiment.

In order to simplify calculation, the rendering system 100 may perform projection by using only four basis points. For example, as illustrated in FIG. 8, in response to a central point of the object 400 being (Xc, Yc), the rendering system 100 may calculate the four basis points (($X_{P1}$, $Y_{P1}$), ($X_{P2}$, $Y_{P2}$), ($X_{P3}$, $Y_{P3}$), ($X_{P4}$, $Y_{P4}$)) according to the following formula using coefficient 1.4 in order to prevent an error which may occur during the projection operation onto the object 400. However, this is merely an example, and the coefficient may vary depending upon an angle that the observer 410 views the object.

$$X_{P1}=X_C+1.4R; Y_{P1}=Y_C \quad \text{[Formula 1]}$$

$$X_{P2}=X_C-1.4R; Y_{P2}=Y_C \quad \text{[Formula 2]}$$

$$Y_{P3}=Y_C+1.4R; X_{P3}=X_C \quad \text{[Formula 3]}$$

$$Y_{P4}=Y_C-1.4R; X_{P4}=X_C \quad \text{[Formula 4]}$$

By the above formulas 1 to 4, the rendering system 100 may obtain a quadrangle screen projection 480 having an edge length of 2.8R as an object area (where R is the radius of the object 400). In addition, the rendering system 100 may trace a ray with respect to each pixel of the projected quadrangle screen 480.

Figure 9:
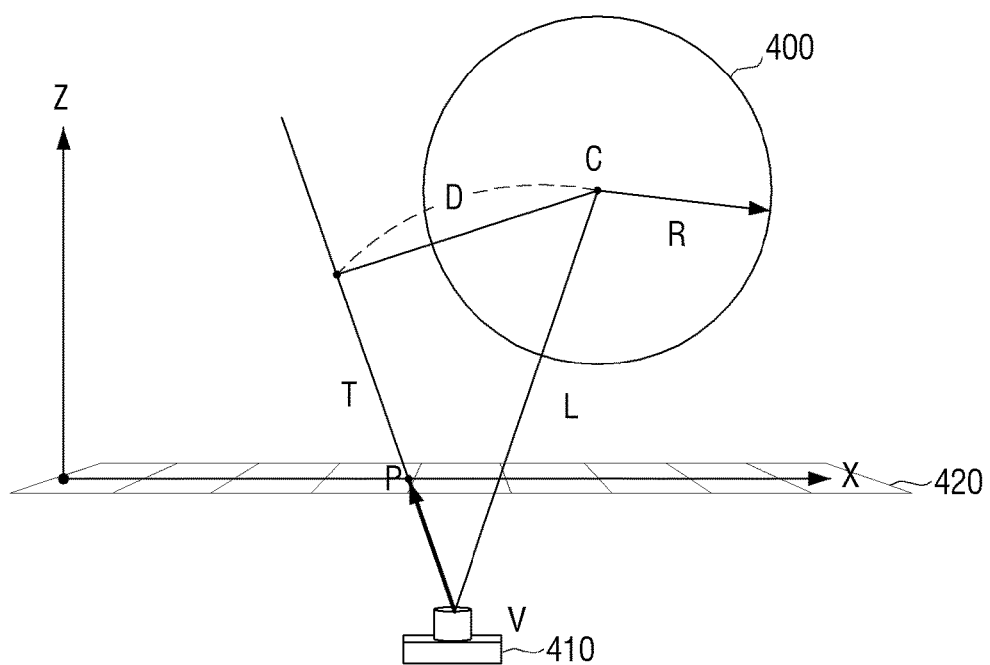
FIG. 9 is a diagram illustrating generation of a ray in a viewpoint of an observer according to an exemplary embodiment.

FIG. 9 is a diagram illustrating generation of a ray in viewpoint of an observer (V) 410 according to an exemplary embodiment. That is, the rendering system 100 may generate a ray (VP) in a viewpoint of the observer 410. Until an intersection between the object 400 and the ray (VP) is found, the rendering system 100 may cross the tree which is the acceleration data structure from a root to a leaf, and from a left side to a right side. The rendering system 100 may calculate the intersection point only in response to an intersection occurring on the leaf object. That is, in the node object, the rendering system 100 may determine only existence of the intersection.

In response to the intersection being found, the rendering system 100 may calculate the intersection point. The rendering system 100 may generate a reflected ray and mix a color of the current object 400 with a color of the reflected object 400. In addition, the rendering system 100 may cast the ray in a direction of a light source in order to calculate a final color of the object 400.

For example, as shown in FIG. 9, in response to a value obtained by subtracting a square value of D from a square value of radius R of a sphere being greater than 0, the rendering system may determine that the ray intersects with the object 400.

The value of D may be calculated by subtracting a square value of T from a square value of L according to Pythagoras' theorem. The value of L may be calculated by using a coordinate value of a location of the observer (V) and a coordinate value of the central point of the object 400. T may be calculated by the following formula 5.

$$T = \vec{VC} \cdot \frac{\vec{VP}}{|\vec{VP}|} \quad \text{[Formula 5]}$$

Accordingly, in order for the ray to intersect with the object 400, Formula 6 should be satisfied.

$$R^2 - L^2 + \left(\vec{VC} \cdot \frac{\vec{VP}}{|\vec{VP}|}\right)^2 > 0 \quad \text{[Formula 6]}$$

Formula 7 is obtained by multiplying both sides of Formula 6 by $|\vec{VP}|^2$.

$$(R^2-L^2)(|\vec{VP}|)^2+(\vec{VC}\cdot\vec{VP})^2>0 \quad \text{[Formula 7]}$$

In order to obtain a coordinate of an intersection point, parameter $T_1$ may be calculated by Formula 8.

$$T_1 = (R^2 - L^2) + \frac{(\vec{VC}\cdot\vec{VP})^2}{(|\vec{VP}|)^2} > 0 \quad \text{[Formula 8]}$$

Current parameter t is caluclated by Formula 9.

$$t = T - \sqrt{T_1} \quad \text{[Formula 9]}$$

Accordingly, coordinates [X, Y, Z] of the intersection point may be represented by Formula 10.

$$[X,Y,Z]=[X_V,Y_V,Z_V]+t \cdot [X_{VPnorm}, Y_{VPnorm}, Z_{VPnorm}] \quad \text{[Formula 10]}$$

$[X_V, Y_V, Z_V]$ of Formula 10 represents a coordinate value of the observer (V) 410. In addition, $[X_{VPnorm}, Y_{VPnorm}, Z_{VPnorm}]$ represents a coordinate value of a normalized vector of Vector VP.

For realistic screen rendering, the rendering system 100 may use at least one reflection with respect to each object. For example, the rendering system 100 may detect an intersection between the reflected ray and at least one object by using an algorithm. A color of the object which intersects with the reflected ray may be mixed with a color of an object which is currently rendered.

Figure 10:
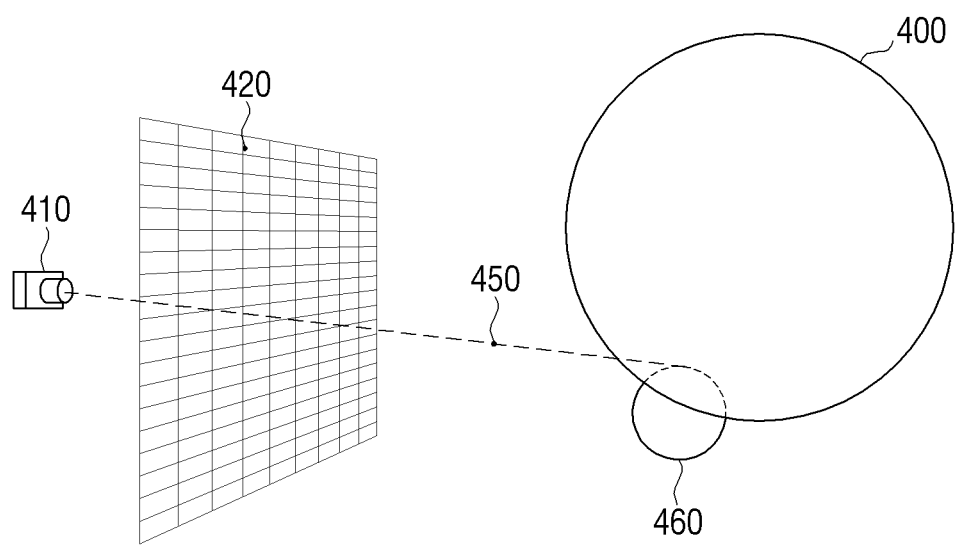
FIG. 10 is a diagram illustrating intersection of objects according to an exemplary embodiment.

FIG. 10 is a diagram illustrating intersection of objects according to an exemplary embodiment. In response to an original point of the reflected ray 450 being located inside of the sphere shaped object, the rendering system 100 may determine that the objects 400 and 460 intersect with each other.

By the aforementioned ray-tracing method, quick, precise, and realistic rendering of a 3D model by using a single chip may be performed.

Figure 11:
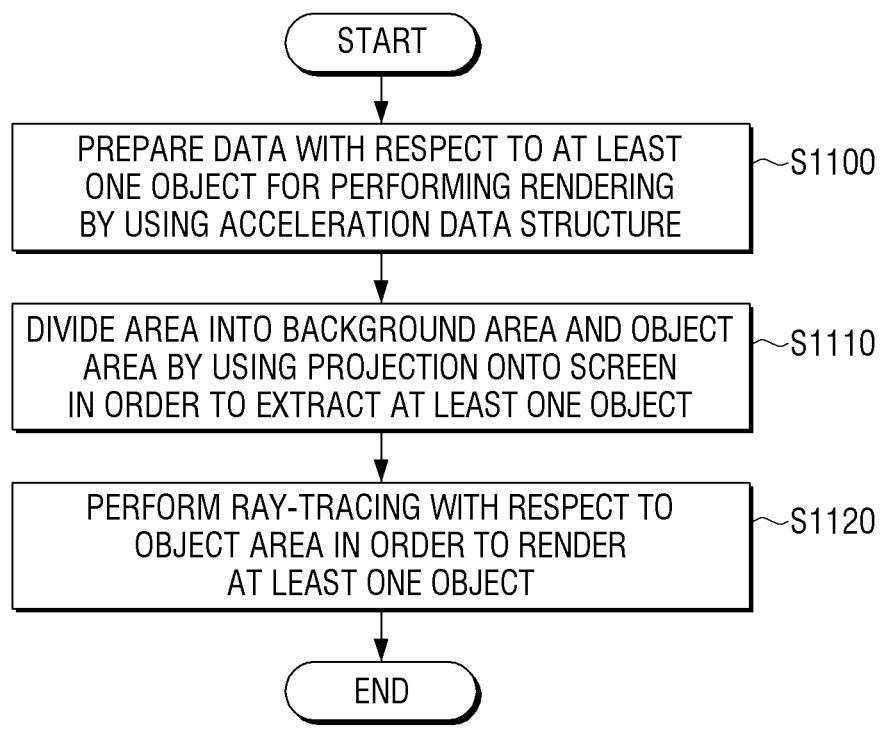
FIG. 11 is a flowchart illustrating a rendering method of a rendering system according to an exemplary embodiment.

FIG. 11 is a flowchart illustrating a rendering method of the rendering system 100 according to an exemplary embodiment.

The rendering system 100 prepares data, with respect to at least one object, for performing rendering by using an acceleration data structure (S1100).

The rendering system 100 divides an area into a background area and an object area by using projection onto a screen in order to extract at least one object (S1110). For example, the rendering system 100 may mark and classify pixels in a background area as background pixels, based on a result of the projection. The object area refers to an area where a new object, calculated so as to include a predetermined number of objects, is projected onto a screen, out of at least one object.

The rendering system 100 performs ray-tracing with respect to the object area in order to render at least one object (S1120).

The rendering method of the rendering system according to the aforementioned various exemplary embodiments may be embodied as computer-readable code on a computer-readable recording medium. Such non-transitory readable medium may be mounted on various devices.

The computer-readable recording medium refers to any medium which may store data that can be thereafter read by a computer system. Examples of the computer-readable recording medium include a compact disc (CD), a digital versatile disk (DVD), a hard disk, a Blu-ray disk, a universal serial bus (USB), a memory card, a random-access memory (RAM), a read-only memory (ROM), and the like, and provided therein.

Moreover, it is understood that in exemplary embodiments, one or more units of the above-described apparatuses can include circuitry, a processor, a microprocessor, and the like, and may execute a computer program stored in a computer-readable medium.

The foregoing exemplary embodiments and advantages are merely exemplary and are not to be construed as limiting the present inventive concept. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A rendering method of a rendering system, the method comprising:
    in response to data being input, obtaining at least one object corresponding to the data;
    classifying the at least one object based on a distance of the at least one object to a screen by a controller;
    generating an acceleration data structure with respect to the classified at least one object by the controller;
    calculating a basis point of at least one root node of the acceleration data structure by the controller;
    performing, using a projection matrix, projection onto the screen by the controller;
and marking and classifying background pixels as a background area based on a result of the projection by the controller; and
    performing ray-tracing with respect to pixels other than the background pixels;
        wherein the obtaining comprises obtaining a new object including a predetermined number of objects adjacent to each other among the at least one object, and
        wherein the classifying comprises classifying the at least one object including the new object based on a distance of the at least one object to the screen by the controller.

2. The method as claimed in claim 1, wherein the acceleration data structure is a Bounding Volume Hierarchy (BVH) tree structure.

3. The method as claimed in claim 1, wherein the performing comprises:
    performing a first operation that generates an initial ray, detects a point where the initial ray intersects with a sphere or a plane, and performs a first rendering by the controller; and
    performing a second operation that generates at least one reference ray from the initial ray, detects a point where the at least one reference ray intersects with at least one of a sphere and a plane, and performs a second rendering by the controller.

4. The method as claimed in claim 3, wherein the first operation and the second operation are performed in parallel with each other.

5. A rendering system comprising:
    a controller configured to:
        in response to data being input, obtain at least one object corresponding to the data,
        classify the at least one object based on a distance to a screen,
        generate an acceleration data structure with respect to the classified at least one object,
        calculate a basis point of at least one root node of the acceleration data structure,
        perform, using a projection matrix, projection onto the screen, and
        mark and classify background pixels as a background area based on a result of the projection; and
    a ray tracer configured to perform ray-tracing with respect to pixels other than the background pixels;
    wherein the controller is further configured to:
        obtain a new object including a predetermined number of objects adjacent to each other among the at least one object; and
        classify the at least one object including the new object based on a distance of the at least one object to the screen.

6. The system as claimed in claim 5, wherein the acceleration data structure is a Bounding Volume Hierarchy (BVH) tree structure.

7. The system as claimed in claim 5, wherein the ray tracer is further configured to perform a first rendering operation by generating an initial ray and detecting a point where the initial ray intersects with at least one of a sphere and a plane, and perform a second rendering operation by generating at least one reference ray from the initial ray and detecting a point where the at least one reference ray intersects with at least one of a sphere and a plane.

8. The system as claimed in claim 7, wherein the first rendering operation and the second rendering operation are performed in parallel with each other.

* * * * *